(12) United States Patent
Eggenwirth et al.

(10) Patent No.: US 10,738,510 B1
(45) Date of Patent: Aug. 11, 2020

(54) GEOFENCE TRANSPORT SEALING

(71) Applicant: Amazon Technologies, Inc., Seattle, WA (US)

(72) Inventors: Axel Eggenwirth, Munich (DE); Behrad Aria, Alameda, CA (US); William DeLorenzo, Doylestown, PA (US); William Greger, San Francisco, CA (US); Jennifer Kim, Issaquah, WA (US); Sergio Mendola, Georgetown, MA (US); Charles Watson, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 6 days.

(21) Appl. No.: 16/146,939

(22) Filed: Sep. 28, 2018

(51) Int. Cl.
  *E05B 83/14* (2014.01)
  *E05B 77/44* (2014.01)
  *E05B 81/04* (2014.01)
  *E05B 81/74* (2014.01)
  *E05B 81/56* (2014.01)
  *H04W 4/021* (2018.01)
  *E05B 81/82* (2014.01)

(52) U.S. Cl.
  CPC .............. *E05B 83/14* (2013.01); *E05B 77/44* (2013.01); *E05B 81/04* (2013.01); *E05B 81/56* (2013.01); *E05B 81/74* (2013.01); *E05B 81/82* (2013.01); *H04W 4/021* (2013.01); *E05Y 2400/30* (2013.01); *E05Y 2400/612* (2013.01); *E05Y 2400/66* (2013.01); *E05Y 2900/516* (2013.01); *E05Y 2900/531* (2013.01)

(58) Field of Classification Search
  CPC .......... E05B 83/14; E05B 77/44; E05B 81/04; E05B 81/56; E05B 81/74; E05B 81/82; H04W 4/021; E05Y 2400/30
  See application file for complete search history.

(56) References Cited

U.S. PATENT DOCUMENTS

| 6,057,779 | A | * | 5/2000 | Bates | G07C 9/00912 |
| | | | | | 340/5.21 |
| 7,002,472 | B2 | | 2/2006 | Stratmoen et al. | |
| 10,097,353 | B1 | | 10/2018 | Carlson | |
| 2003/0102957 | A1 | * | 6/2003 | Crisp | G07C 9/00309 |
| | | | | | 340/5.2 |
| 2007/0018787 | A1 | * | 1/2007 | Martinez de Velasco Cortina | |
| | | | | | G07C 9/28 |
| | | | | | 340/5.61 |
| 2008/0229792 | A1 | * | 9/2008 | Maple | E05B 39/00 |
| | | | | | 70/275 |
| 2009/0326813 | A1 | * | 12/2009 | Miller | G07C 5/085 |
| | | | | | 701/532 |
| 2010/0251785 | A1 | | 10/2010 | Zarei | |
| 2014/0250954 | A1 | | 9/2014 | Buzhardt | |

(Continued)

Primary Examiner — Thomas D Alunkal
(74) Attorney, Agent, or Firm — Knobbe, Martens, Olson & Bear, LLP

(57) ABSTRACT

Features are disclosed for sealing system which is dynamically activated based on a vehicle's location within a geofence via a custom access application. The seal generates current location information. The current location information is compared to location permissions indicating time or place where the seal may be disabled. If the current location corresponds to an authorized unsealing location, the seal may disengage to allow access to the vehicle.

20 Claims, 10 Drawing Sheets

(56) References Cited

U.S. PATENT DOCUMENTS

| | | | |
|---|---|---|---|
| 2014/0277831 A1* | 9/2014 | Hunt | G07C 5/008 |
| | | | 701/1 |
| 2018/0114386 A1* | 4/2018 | Steinmetz | E05B 39/005 |
| 2018/0328079 A1 | 11/2018 | Lim et al. | |
| 2018/0364738 A1* | 12/2018 | Bridges | G05D 1/0287 |
| 2019/0228374 A1 | 4/2019 | Bean et al. | |
| 2019/0228375 A1 | 11/2019 | Laury et al. | |

* cited by examiner

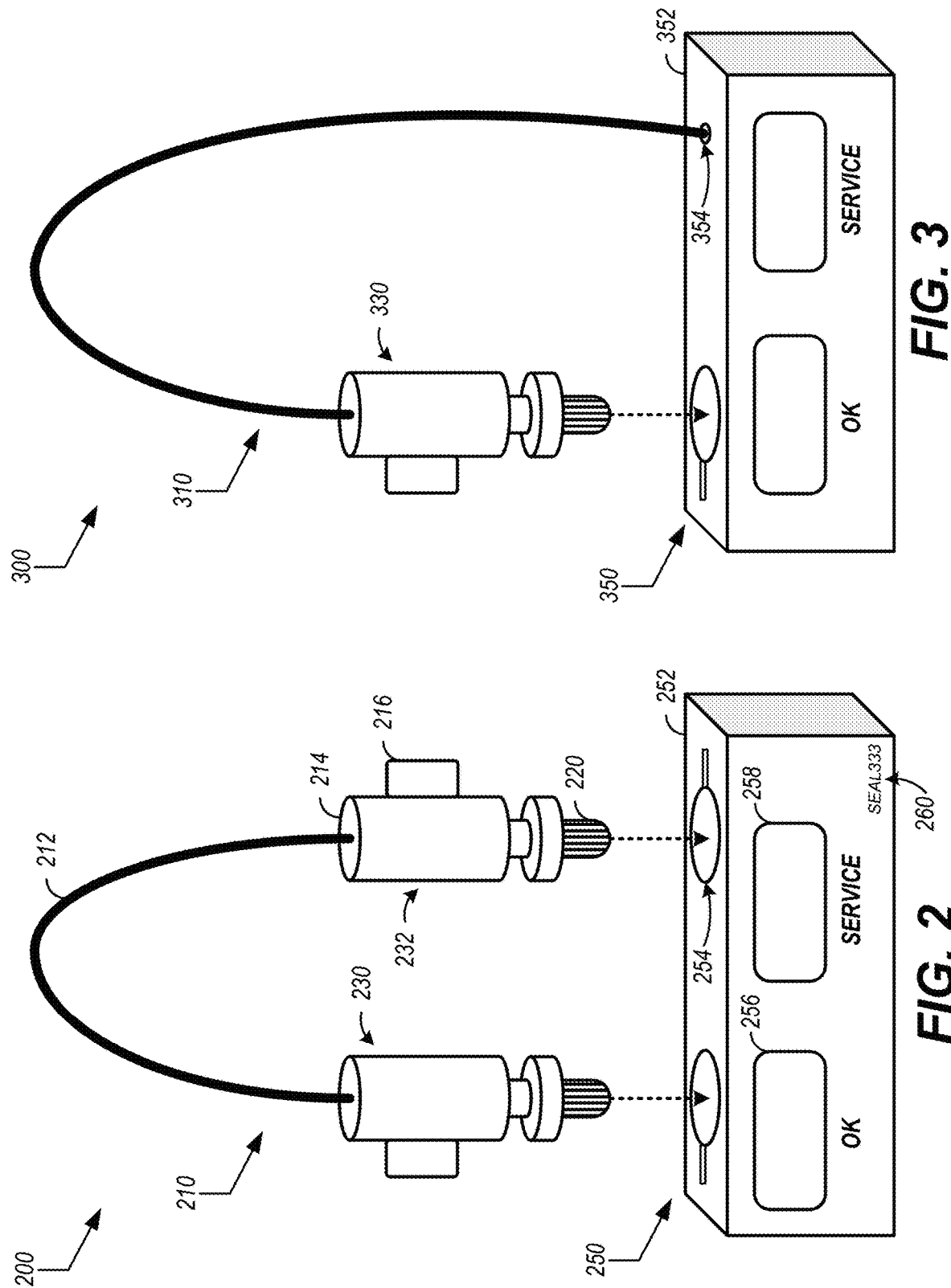

GEOFENCE TRANSPORT SEALING

BACKGROUND

Many companies use vehicles to move items within and between facilities. A transport vehicle may include a cargo area or carry a cargo container to hold the items. It is common to leave the storage container for the items unsecured. If sealed, each stop would require unsealing upon arrival and resealing upon departure. Leaving the storage container unsecured may increase the efficiency of the transport process, but it also increase the likelihood of unauthorized access or theft. One option is to use traditional padlocks with the key or combination given to the operator. This secures the cargo from theft by parties other than the operator. But the padlocks introduce additional logistical friction because the key or combinations must be shared and physically presented. If a key is lost or combination forgotten, the padlock may need to be cut to access the storage container. This can be expensive and time consuming. Furthermore, unlike a seal, a lock simply secures a cargo container, and may not provide evidence of tampering with, or unauthorized access to, the cargo container.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 2 illustrates an example embodiment of a seal with a detachable sealing shackle.

FIG. 3 illustrates an example embodiment of a seal with a mounted sealing shackle.

DETAILED DESCRIPTION

Figure 1:
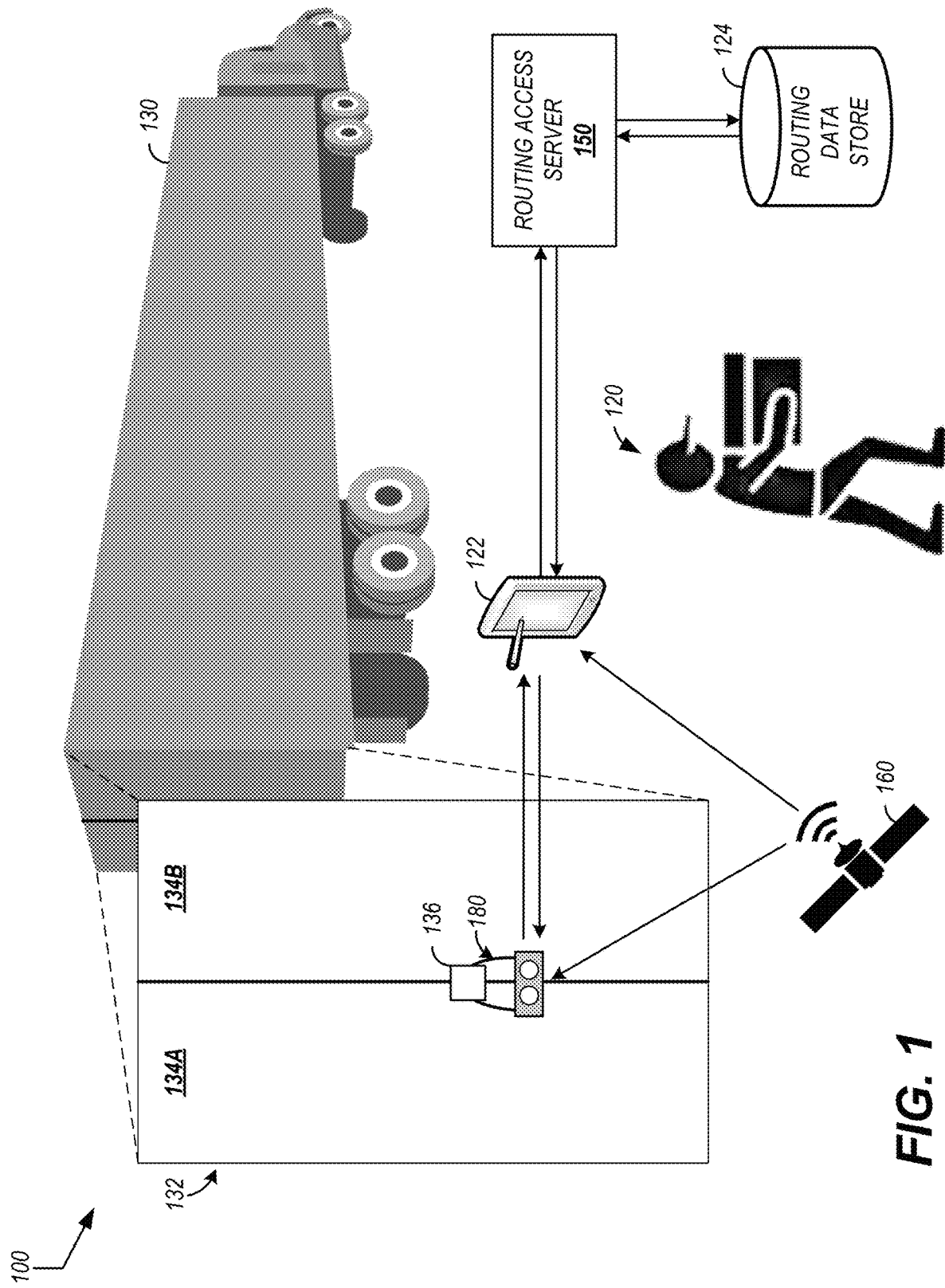
FIG. 1 is a block diagram showing an example environment including an electronic seal system.

A solution for securing a cargo carrier (e.g., the cargo area of a vehicle or a cargo container transported by a vehicle) is an electronic seal system. The electronic seal system includes a seal and a delivery device. The seal includes a sealing box and a sealing shackle that detachably couples with the sealing box. The electronic seal system compares current location information of the seal or delivery device with a stored list of destinations. If the current location corresponds to an approved destination (e.g., a warehouse), the seal may be released. By conditioning seal functionality (e.g., an unseal option) to location, when and where the seal may be opened can be monitored and controlled.

The seal may be implemented as a battery-operated device. Location detection may be performed by the delivery device or within the seal to record the time and location coordinates where the seal was sealed and unsealed. The location detection may include detecting time and location from a Global Positioning System (GPS). The seal may transmit the log to the delivery device or other communication device via a wireless protocol such as the BLUETOOTH® protocol. The seal may include a status indicator such as a light emitting diode (LED) to indicate one or more operational states (e.g., battery status, connection status with a delivery device, error). The seal may include an auxiliary power input for emergency release function. Once the sealing shackle is inserted in the seal box, sealing, status monitoring, and logging operations may start.

The sealing shackle can be fully removable from the vehicle or semi-permanently attached to the vehicle. The removable sealing shackle opens the possibility of spoofing the system by engaging the seal while not actually sealing the cargo carrier. For example, the operator could keep the sealed device on the passenger seat inside the truck. The semi-permanently attached cable reduces this possibility. To further enhance the reliability of the seal, the sealing shackle may include one or more passive memory devices at the terminating ends of the sealing shackle. These modules may communicate with a microcontroller in the seal when properly inserted. The electronic seal system can detect the actual sealed or unsealed state based on a position of a motor included in the sealing box. The system can identify authentic sealing shackles by comparing information stored in a memory device with an expected, authentic value. This allows a pairing operation between the sealing box and the sealing shackle and prevents sealing an authentic seal in the absence of the sealing shackle.

The delivery device may be a mobile phone or other device using a low energy wireless communication protocol to for communications between the delivery device and the electronic seal box. The seal could only be unsealed when the device or the seal are within a particular geofence. A geofence refers to a spatial area defined by a boundary. The geofence may be specified as a point radius circle or a polygon of coordinate pairs, where a coordinate pair represents a vertex of the polygon.

The electronic seal system is configured to recognize when the seal is within the geofence and then allow the operator to transmit a code to unseal or seal via the wireless communication protocol. Cellular and GPS coverage may be used by the delivery device to support the routing and location detection functions while in transport. In some implementations, the location detection may be performed by the seal. In such implementations, the seal may determine if it is inside the defined geofence to allow unsealing of the seal.

FIG. 1 is a block diagram showing an example environment including an electronic seal system. The environment 100 may include a delivery device 122 for a delivery agent 120. The delivery agent 120 may be the operator of a vehicle 130 used to transport items from one location to another location.

The delivery device 122 may receive route information from a routing access server 150. The route information may include a sequence of locations the delivery agent 120 is to visit. The route information may also include location information for sealing or unsealing a seal 180. The route information may be stored in a routing data store 124 in communication with the routing access server 150.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

The seal 180 may be applied to prevent a first door 134a and a second door 134b of the vehicle 130 from opening. The seal 180 may pass through hardware 136 affixed to the first door 134a and the second door 134b. In this position, the seal 180 prevents the first door 134a and the second door 134b from opening. Embodiments of the seal 180 are shown and discussed further with reference to FIGS. 2, 3, and 9. As noted, the features described relate to securing doors or other access portals of a vehicle. The vehicle 130 may be implemented as a car, truck, van, boat, aircraft, or other mobile apparatus that can be used to transport physical items.

The delivery device 122 of the delivery agent 120 may be an electronic communication device configured to transmit machine readable messages via multiple wireless communication protocols. Non-limiting examples of the delivery device 122 include a personal computing device, laptop computing device, hand held computing device, mobile device (e.g., mobile phones or tablet computing devices), wearable device configured with network access and program execution capabilities (e.g., "smart eyewear" or "smart watches"), wireless device, electronic reader, or some other portable electronic device or appliance. The messages may be formatted according to a standardized protocol such as transmission control protocol/Internet protocol (TCP/IP), hypertext transfer protocol (HTTP), file transfer protocol (FTP), or the like. The transmission may be sent via wireless or hybrid wired-wireless networks.

The delivery agent 120 may interact with one or more user interfaces presented via the delivery device 122 to identify the route and interact with the seal 180. The user interfaces may include control elements to receive input or adjust a function of the delivery device 122. Example user interfaces are discussed with reference to FIGS. 10A-10D below.

The delivery device 122 and, in some implementations the seal 180, may receive location information identifying a current location of the delivery device 122 or the seal 180. The location information may be received from a satellite based global positioning system 160. A wireless location transceiver may be included in a device to facilitate receipt and decoding of signals from the global positioning system 160. In some implementations, the device may calculate its location based on signals received from multiple satellites included in the global positioning system 160.

FIG. 2 illustrates an example embodiment of a seal with a detachable sealing shackle. The seal 200 includes a sealing shackle 210 and a sealing box 250. The sealing shackle 210 includes a link line 212. The link line 212 may be formed of a semi-flexible material such a steel wire or aircraft cable wire. In some implementations, the link line 212 may include a chain, a tube of strong composite plastic, carbon nanotubes, an inflexible U-shape bar, or the like. The link line 212 may be coated with a weatherproofing sheath such a vinyl sheath. The link line 212 may be two feet in length. Affixed to opposing ends of the link line 212 are memory devices 230 and 232. The memory devices 230 and 232 may be externally powered (e.g., by the sealing box 250).

The memory device 232 includes a body 214 and a positioning flange 216. The dimensions of the body 214 and the positioning flange 216 correspond to a coupling channel 254 in the sealing box 250. This ensures the memory device 232, when inserted into the sealing box 250, forms a conductive coupling with the sealing box 250 via a terminal 220. Through the terminal 220, the sealing box 250 may retrieve information stored in the memory device 232 to confirm the authenticity of the sealing shackle 210. The terminal 220 may also provide a path for power to be provided from the sealing box 250. The memory device 232 may include memory to store information associated with the sealing shackle 210 or the memory device 232. The memory may be referred to as cable memory.

The memory device 232 also includes a sealing notch 218. The sealing notch 218 provides a physical space for engagement with a seal shaft included in the sealing box 250. The seal shaft may extend into the sealing notch 218 to secure the sealing shackle 210. In this position, the sealing shackle 210 cannot be removed from the coupling channel 254. The seal shaft may retract in response to an unseal message, allowing the sealing shackle 210 to be removed from the coupling channel 254. Further details of the sealing mechanism are included with reference to FIGS. 4A, 4B, 5A, and 5C below.

The sealing box 250 includes a housing 252. The housing 252 may be formed of durable weatherproof materials to keep the electronics dry and protected from jostling or other movements while in transit. The sealing box 250 may include one or more indicators (e.g., indicator 256 and indicator 258) for presenting operational information about the seal 200.

The housing 252 may include an identifier 260. The identifier 260 may provide a unique, perceivable indicia that can be used to find the sealing box 250. For example, a physical location may include several cargo carriers, each having respective sealing boxes. The identifier 260 can allow an operator to find the sealing box assigned for a route associated with the cargo carrier to be sealed. In some implementations, the identifier 260 may be a scannable identifier such as a barcode, quick response code, magnetic strip, near field communication code, radio frequency identifier code, or other device detectable identifier. An operator can scan the identifier 260 to obtain information to connect with the sealing box 250 on which the identifier 260 is placed.

In FIG. 2, the sealing shackle 210 includes two memory devices. In some implementations, it may be desirable to include one memory device rather than two in the sealing shackle.

FIG. 3 illustrates an example embodiment of a seal with a mounted sealing shackle. In the seal 200 of FIG. 2, each end of the sealing shackle 210 included a memory device. In the seal 300 shown in FIG. 3, only one end of a sealing shackle 310 includes a memory device 330. The other end of the sealing shackle 310 is mounted to a sealing box 350. The mounted end of the sealing shackle 310 may extend through an opening 354 in a housing 352 of the sealing box 350. The mounted end may be physically affixed to a structure within the housing 352.

Figure 4A:
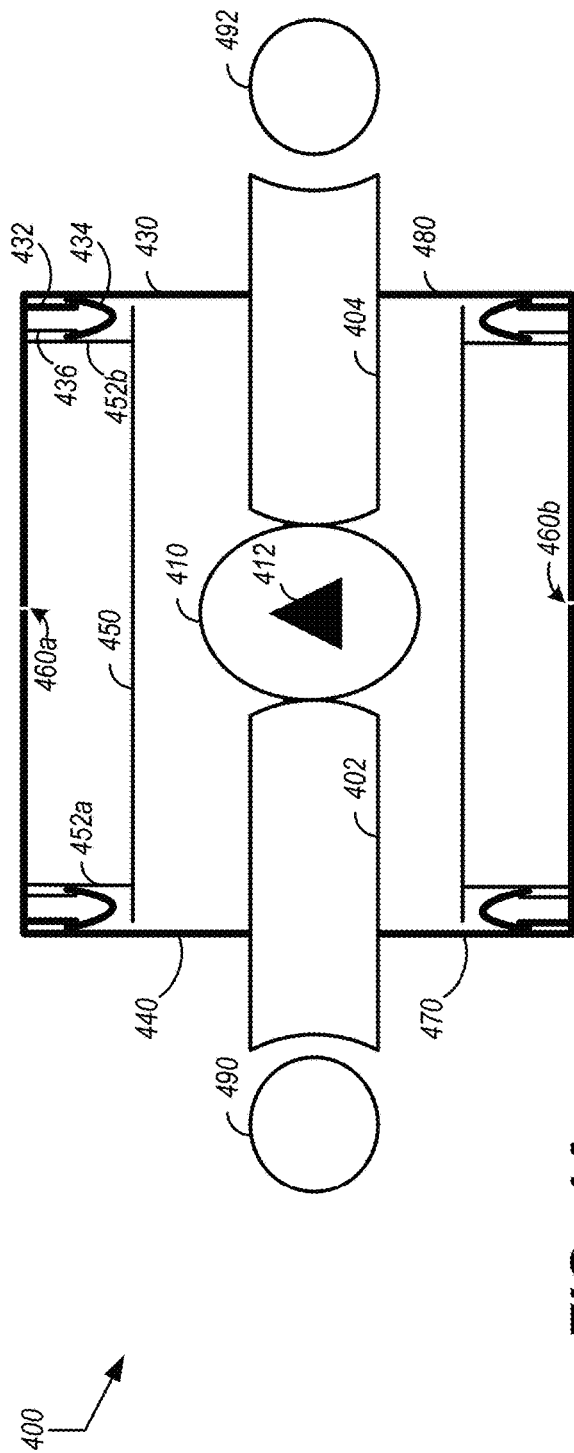
FIG. 4A illustrates an overhead view of a sealing mechanism which may be included in a sealing box.

FIG. 4A illustrates an overhead view of a sealing mechanism which may be included in a sealing box. The sealing mechanism 400 includes a rotatable seal driver 410 and opposing seal shafts (e.g., seal shaft 402 and seal shaft 404). The seal shaft 402 is positioned to engage with a memory device 490 when inserted into a coupling channel. The seal shaft 404 is positioned to engage with a memory device 492 when inserted into another coupling channel. For illustrative purposes, a directional orientation symbol 412 is included to indicate the position of the rotatable seal driver 410.

The sealing mechanism 400 may include retraction elements to disengage the seal shafts when the seal driver 410 returns to the position shown in FIG. 4A. The retraction elements for the seal shaft 404 include a first return carrier 430. The first return carrier 430 is attached to the seal shaft 404 and can move laterally when the seal shaft 404 moves. The first return carrier 430 includes a carrier post 432. The carrier post 432 forms a channel that can receive one end of a spring element 434. The spring element 434 may be formed of metal or other elastic material. Examples of the spring element 434 include a coiled extension spring or a deformable u-shaped spring. For example, the spring element 434 may be an extension spring whereby the spring element 434 is at rest in the closed position shown in FIG. 4A. When the first return carrier 430 extends, the spring element 434 is extended (see FIG. 5A). The extension can cause the spring element 434 to store energy. This energy is what may cause the seal shaft 404 to return to the position shown in FIG. 4A after disengaging from the memory device 492. The sealing mechanism 404 may include a second return carrier 440 similar to the first return carrier 430 for the seal shaft 402. As shown in FIG. 4A, each seal shaft may include opposing return carriers, one attached to respective edges of the seal shaft. For example, return carrier 470 may be affixed to the seal shaft 402 and oppose the second return carrier 440.

A return stabilizer 450 may be included. The return stabilizer 450 may not move when the seal shafts move. This provides fixed positions for the spring elements. For example, as shown in FIG. 4A, the return stabilizer includes a first stabilizer post 452a and a second stabilizer post 452b. A second end of the spring element 434 is received in a channel formed by the second stabilizer post 452b and a post 436. The first return carrier 430 may include a channel through which the second stabilizer post 452b and the post 436 pass to couple with an interior surface of the housing of the sealing box. The first stabilizer post 452a, the second stabilizer post 452b, and the post 436 maintain a static position as the seal shafts move.

A gap 460a may be formed between return carriers 430 and 440 affixed to the seal shafts 402 and 404, respectively. In some implementations, the return carriers 430 and 440 may join to close the gap 460a. A similar gap 460b may be present between opposing return carriers 460 and 480. The return carriers 470 and 480 may be coupled with sides of the seal shafts 402 and 404, respectively.

Figure 4B:
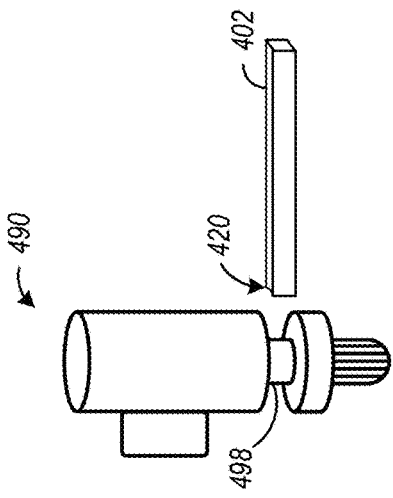
FIG. 4B illustrates a perspective view of a portion of the sealing mechanism shown in FIG. 4A.

FIG. 4B illustrates a perspective view of a portion of the sealing mechanism shown in FIG. 4A. The seal shaft 402 is shown disengaged from the memory device 490. An engagement surface 420 may include a curve or other shape to engage with a post 498 within the sealing notch of the memory device 490.

Figures 5A, 5B:
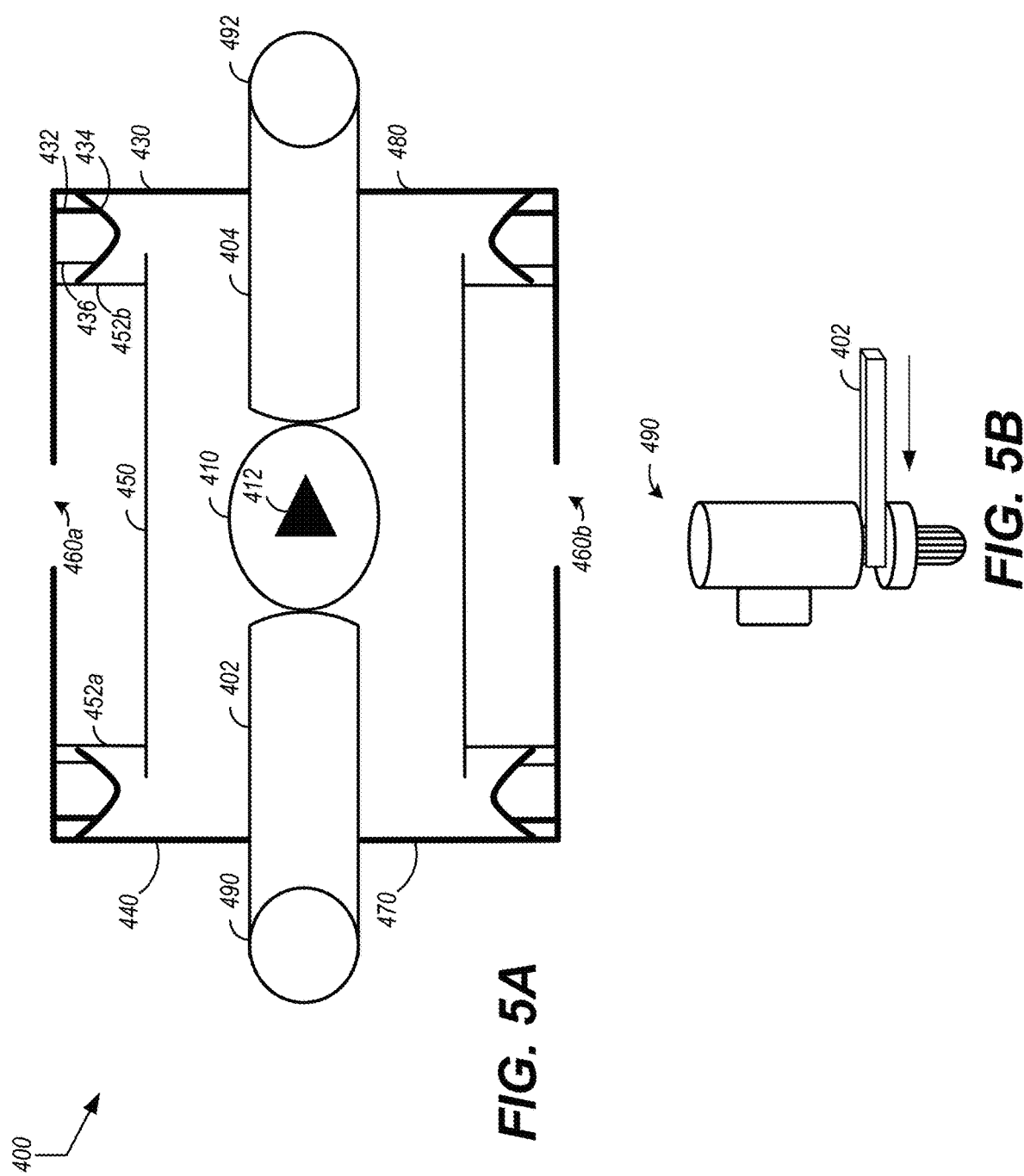
FIG. 5A illustrates an overhead view of the sealing mechanism of FIG. 4A in an engaged position.
FIG. 5B illustrates a perspective view of the sealing mechanism of FIG. 5A in the engaged position.

FIG. 5A illustrates an overhead view of the sealing mechanism of FIG. 4A in an engaged position. A motor included in the sealing box may apply a force to the rotatable seal driver 410. As the rotatable seal driver 410 spins, the seal shaft 402 and the seal shaft 404 move away from the rotatable seal driver 410 to engage the respective memory devices. As shown in FIG. 5A, the rotatable seal driver 410 was rotated 90 degrees in a clockwise direction. The directional orientation symbol 412 reflects this position change.

As a result of the seal shaft 404 moving toward the memory device 492, the gap 460a and the gap 460b in FIG. 5A is larger than shown in FIG. 4A. The spring elements have also expanded due to the lateral movement of the seal shafts. This expansion causes tension to be exerted by the spring elements. When the seal driver 410 rotates to a position, such as that shown in FIG. 4A, the tension will cause the seal shafts to move away from the memory devices toward the seal driver 410. Thus, the seal carriers will retract the seal shafts allowing the sealing box to be decoupled from the sealing shackle.

FIG. 5B illustrates a perspective view of the sealing mechanism of FIG. 5A in the engaged position. As a result of the motion toward the memory device 490, the seal shaft 402 has entered the sealing notch to engage with the post 498 (not visible). In this position, the memory device 490 cannot be vertically moved due to the physical impedance of the seal shaft 402.

Figure 6:
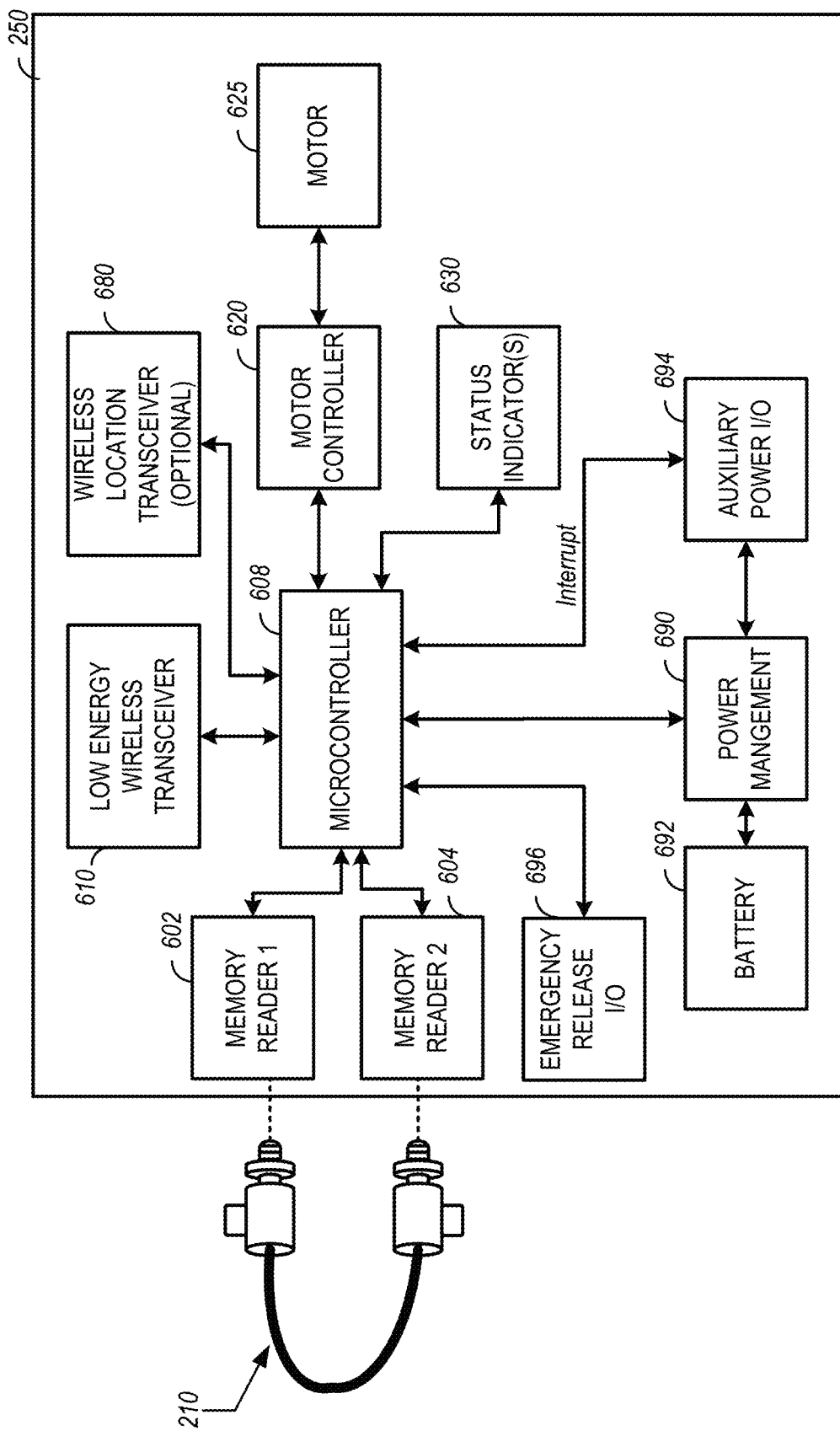
FIG. 6 is a functional block diagram of components included in an example sealing box.

FIG. 6 is a functional block diagram of components included in an example sealing box. The sealing box 250 may include memory readers to retrieve information from the sealing shackle 210. As shown in FIG. 6, the sealing shackle 210 includes two memory devices. Accordingly, the sealing box 250 includes a first memory reader 602 and a second memory reader 604. The memory readers are located within the coupling channels of the sealing box 250 to form a conductive link with the memory devices of the sealing shackle 210 when received by the coupling channels.

A microcontroller 608 may coordinate the functioning of the sealing box 250. For example, the microcontroller 608 may activate the first memory reader 602 to retrieve an authentication value stored in a memory device. In some implementations, the memory readers may be activated upon connection with a memory device. In such an implementation, the reading of the authentication value may be performed without activation from the microcontroller 608. As shown in FIG. 6, the first memory reader 602 and the second memory reader 204 are coupled with the microcontroller 608 via independent connections. In some implementations, a common path may be shared by the first memory reader 602 and the second memory reader 604. In such implementations, the microcontroller 608 may address messages transmitted to a specific reader. The memory readers may respond to messages including their address.

Once the microcontroller 608 receives the authentication value, the microcontroller 608 may compare the authentication value with a shackle verification value stored in a data store included in the sealing box 250. If the authentication value corresponds to the stored shackle verification value, the microcontroller 608 may deem the sealing shackle 210 authentic and suitable to protect the vehicle. If the authentication value does not correspond to the stored shackle verification value, the microcontroller 608 may activate one or more status indicators 630. For example, a light may be activated to indicate the authentication error. In some implementations, the sealing box 250 may include an audio output device to play warning sounds or messages. The status indicator(s) 630 may be activated to identify the sealing box 250. For example, when a delivery device is attempting to connect with the sealing box 250, an identification request may be transmitted from the delivery device to the sealing box 250. The identification request may cause the status indicator(s) 630 to activate in a perceivable pattern that signals receipt of the identification request. For example, using the embodiment shown in FIG. 2, the first indicator 256 and the second indicator 258 may alternately activate for a period of time.

The sealing box 250 may include a low energy wireless transceiver 610. One example low energy wireless transceiver is a BLUETOOTH Low Energy (BLE) transceiver such as that described in the Bluetooth 4.0 specification. The low energy wireless transceiver 610 may communicate with the delivery device 122 such as to report or adjust the seal state, transfer event logs, or exchange route information indicating locations where the seal should be engaged and where the seal can be released.

Upon connecting with the delivery device 122, the sealing box 250 and the delivery device 122 may be referred to as paired. Once connected, the microcontroller 608 may transmit a message to the delivery device 122 via the low energy wireless transceiver 610. The message may indicate the status of the seal and/or whether the seal is ready for engagement.

The low energy wireless transceiver 610 may receive a seal request message from the delivery device 122. The seal request message may cause the microcontroller 608 to activate a motor controller 620 to engage the seal. The motor controller 620 may regulate a motor 625 which may apply a force to a rotatable seal driver, such that as shown in FIG. 4A. Regulating the motor 625 may include controlling the power transmitted to the motor 625. As the motor controller 620 completes engaging the seal, the microcontroller 608 may adjust one or more of the status indicators 630 to reflect the engaged state. The microcontroller 608 may create an event in its log indicating when and, if the sealing box 250 includes a wireless location transceiver 680, where the event occurred.

If included in the sealing box 250, the wireless location transceiver 680 may collect location information for the sealing box 250. The collection may be based on time to preserve power and processing resources of the sealing box 250. When new location information is available, the microcontroller 608 may compare the location indicated by the location information to a destination location. If the location corresponds to the destination location, the microcontroller 608 may adjust a status indicator 630 to signal that the seal may be unsealed. In some implementations, the microcontroller 608 may automatically request the motor controller 620 activate the motor 625 to disengage the seal.

The sealing box 250 may include a power management unit 690. The power management unit 690 controls the source of power for the sealing box 250. A battery 692 may be included as a primary source of power. The battery 692 may be a rechargeable battery such as a lithium based battery. When not in use, the sealing box 250 may be recharged via a docking station (not shown).

An auxiliary power input/output (I/O) interface 694 may be included to receive power from an external source such a power cable or other device. The power management unit 690 may also detect a level of power available such as a level of the battery 692 or actual power provided by the battery 692. This allows the power management unit 690 to monitor the performance of the battery 692 and provide an alert to the microcontroller 608 when the level falls below a threshold or the output of the battery 692 deteriorates. This can provide early detection and alerting of a potential power failure before the power actually fails further reducing security risks.

The auxiliary power I/O interface 694 may be coupled directly with the microcontroller 608 via an interrupt channel. The interrupt channel may be desirable to allow the microcontroller 608 to determine when power is provided via the auxiliary power I/O interface 694. This allows the microcontroller 608 to adjust operational state to an auxiliary mode. This may include enabling or disabling certain elements of the sealing box 250 such as a transceiver, motor, or emergency release.

In the event of a power failure or other malfunction, the sealing box 250 may include an emergency release input/output interface 696. The emergency release I/O interface 696 can be mechanical or electromechanical. A mechanical emergency release may provide a key or code that can be entered to release the seal irrespective of its location. An electromechanical release may couple with a device to receive an emergency release code to release the seal irrespective of its current location. Upon emergency release, the microcontroller 608 may log the event in its event log.

As discussed, in one embodiment, the geospatial detection may be performed by the delivery device 122. In another embodiment, the geospatial detection may be performed by the sealing box 250.

Figure 7:
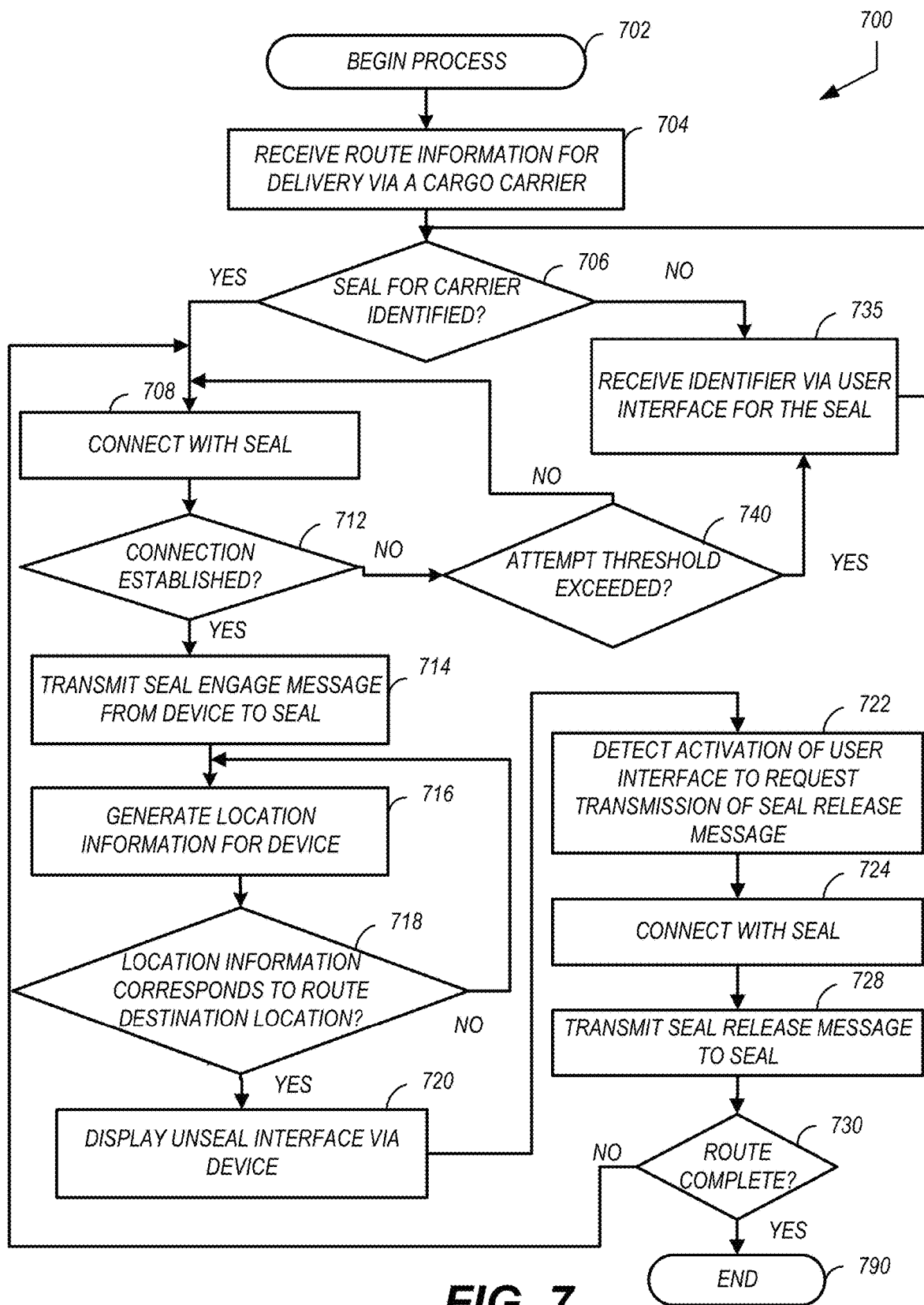
FIG. 7 is a flow diagram depicting an example method of securing an electronic seal via a delivery device.

FIG. 7 is a flow diagram depicting an example method of securing an electronic seal via a delivery device. The method 700 may be implemented in whole or in part by the devices described such as the delivery device 122. The method 700 illustrates how the delivery device 122 may detect location and coordinate adjustment of the seal accordingly.

The method 700 begins at block 702. At block 704, the delivery device may receive route information. The route information may be associated with a user of the delivery device such a delivery agent. The route information may be associated with a vehicle or cargo carrier scheduled to traverse the route. The route information includes locations to traverse and geofence information identifying locations where the seal may be unsecured to permit access to the cargo.

At block 706, the delivery device may determine whether a seal for the cargo carrier is identified. Identifying a seal may include activating a low energy wireless transceiver to scan for nearby devices. The seal may advertise its presence by broadcasting an identifier for the seal. In some implementations, the route information may include an identifier for the seal to be used for the route. In some implementations, the delivery device may present a list of identifiers for detected seals. A selection may be received via the delivery device for a specific seal to connect with.

If the seal is not identified, at block 735, the delivery device may present a user interface to receive manual selection or entry of a seal identifier. The method 700 may then return to block 706 as described.

If at block 706, the seal is identified, at block 708, the delivery device may connect with the seal. Connecting with the seal may include pairing with the seal. Pairing may include exchanging key information to secure communications between the seal and the delivery device. The connection may be via a low energy wireless protocol (e.g., personal area network). This conserves resources of the device and seal. This also ensures the range of devices able to communicate with the seal is limited to a few meters. In some implementations, the connection may include establishing a point to point connection between the delivery device and the seal. The connection may be a peer to peer connection between the delivery device and the seal. In some implementations, the connection may include a master slave connection whereby the delivery device serves as the master and the seal is the slave.

At block 712, the delivery device may determine if a connection is established with the seal. The determination may be based on messages the delivery device receives from the seal. For example, after inviting the seal to connect, the seal may transmit one or more messages to agree to the pairing and acknowledge completion of the connection process. If an acknowledgment is not received, the determination at block 712 may be negative. The method 700 may proceed to block 740 to determine whether a connection attempt threshold has been exceeded. For example, it may be desirable to cease trying to connection with a seal after three failures. If the determination at block 740 is affirmative, the method 700 may processed to block 735 to select a different seal as described. If the determination at block 740 is negative, the method 700 may return to block 708 to re-attempt connecting with the seal.

Returning to block 712, if the connection with the seal is established, at block 714, the delivery device may transmit a seal engage message to the seal. The seal engage message may be transmitted upon activation of a button or other user interface control presented via the delivery device. The user interface element may be hidden until the seal indicates a ready state (e.g., after confirming that sealing shackle is received and authentic). The user interface element may be hidden until the location of the delivery device corresponds to a sealing location. The sealing locations may be included in the route information. Table 1 provides an example representation of sealing location information including coordinates and seal permissions for the locations.

TABLE 1

| | Route Location | Seal Permissions |
|---|---|---|
| 1 | 40.645, −73.787 | Seal |
| 2 | 40,769, −73.882 | Seal or Unseal |
| 3 | 40,685, −71.180 | Unseal |

At this point in the method 700, the seal has secured the vehicle. As the vehicle moves along the route, at block 716, the delivery device may generate location information for the delivery device. Generating the location information may include receiving a GPS signal indicating the location of the delivery device.

At block 718, a determination is made as to whether the location of the delivery device corresponds to a route destination location. The correspondence may be based on a distance threshold. The distance threshold may be applied equally for all destinations. In some implementations, the sealing location information may include a distance threshold for one or more entries. This allows locations in areas with inaccurate GPS coverage (e.g., urban areas) to have a higher threshold than the locations having more accurate GPS coverage.

If the determination at block 718 is negative, the method 700 returns to block 716 as described above. If the determination at block 718 is affirmative, at block 720, the delivery device may display an unseal interface. The unseal interface may include a control element that, when activated, causes the delivery device to transmit an unseal message to the seal.

At block 722, the delivery device may detect activation of the user interface control element. The detection may include sensing via a touchscreen or other input device an interaction with the control element. At block 724, the delivery device may again connect with the seal. In some implementations, the delivery device and the seal may not maintain constant communication to preserve resources. When connecting at block 724, the delivery device may use information from the connection at block 708, such as a communication key, to expedite the connecting at block 724.

Once connected, at block 728, the delivery device may transmit a seal release message to the seal. The seal release message may include a code to provide an additional layer of security and authenticity to the seal release message. In this way, malicious devices cannot transmit a random seal release message to disengage the seal. Rather, the seal may interrogate the seal release message for the code and, if present, release. Releasing the seal may include receiving a release confirmation message from the seal indicating the seal has been successfully released.

At block 730, the coordinating device may determine if the route is complete. The completion of the route may include assessing the route information received a block 704. If the destinations identified in the route information have all been visited, the determination at block 730 may be affirmative. When affirmative, the method 700 may end at block 790. If the route is not complete (e.g., the route information includes at least one unvisited destination), the method 700 may return to block 708 as described.

The method 700 may include additional features to enhance the security of the electronic seal system. For example, the method 700 may include receiving first authentication information for a user of the mobile device. The authentication information may include a user identifier, a username, a password, an image of the delivery agent, or the like. The first authentication information may be compared to second authentication information for an authorized user of the seal. The second authentication information may be provided by the routing access server. In some implementations, the routing access server may perform the comparison and provide a result to the delivery device. The method may include determining that the first authentication information corresponds to the second authentication information. Connecting the delivery device to the seal may be performed after determining that the first authentication information corresponds to the second authentication information.

In FIG. 7, the method 700 focused on the delivery device as the coordinating device for the electronic seal system. In some implementations, the seal may be the coordinating device.

Figure 8:
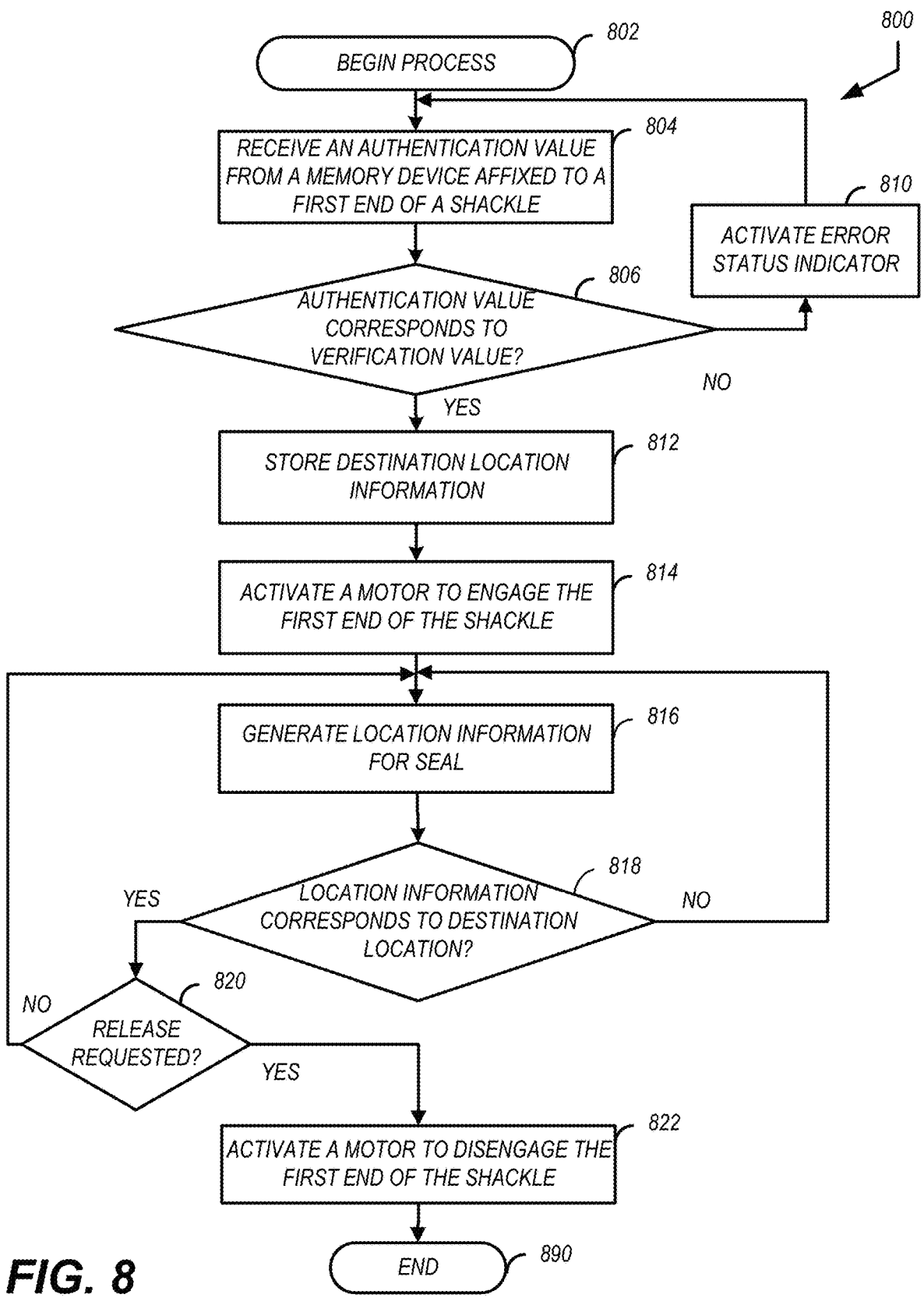
FIG. 8 is a flow diagram depicting an example method of securing an electronic seal via a seal.

FIG. 8 is a flow diagram depicting an example method of securing an electronic seal via a seal. The method 800 may be implemented in whole or in part by the devices described such as the sealing box 250. The method 800 illustrates how the sealing box 250 may detect location and coordinate adjustment of the seal accordingly. At block 802, the method 800 begins. At block 804, the sealing box may receive an authentication value from a memory device affixed to a first end of a sealing shackle. The memory device may store the authentication value in non-volatile memory. The memory may be accessible upon coupling with a memory reader, such as the first memory reader 602 shown in FIG. 6.

At block 806, the sealing box may determine whether the authentication value corresponds to a verification value. The verification value may be stored in memory included in the sealing box. In some implementations, the verification value may be stored in a secure, immutable memory location to further increase the chance of detecting a counterfeit shackle.

If the determination at block 806 is negative, the sealing box may proceed to activate an error status indicator at block 810. Activating an error status indicator may include adjusting an optical indicator (e.g., flashing a light, changing light color), playing an audible sound, or providing other perceivable output indicating the authenticity for the sealing shackle. In some implementations, the sealing box may additionally or alternatively log the error in its event log. The method 800 may then return to block 804 as described.

If the determination at block 806 is affirmative, at block 812, the sealing box may store destination location information. The destination information may include sealing locations such as those shown in Table 1 above. The destination location information may be received from a delivery device. In some implementations, the destination location information may be received while the sealing box is docked for recharging such as from a routing access server.

At block 814, the sealing box may activate a motor to engage the first end of the sealing shackle. The activation may resemble the sealing mechanism shown in FIG. 5A or 5B. At block 816, the sealing box may generate location information indicating the location of the sealing box. Generating the location information may include receiving a GPS signal indicating the location of the device.

At block 818, a determination is made as to whether the location of the seal corresponds to a route destination location. The correspondence may be based on a distance threshold. The distance threshold may be applied equally for all destinations. In some implementations, the sealing location information may include a distance threshold for one or more entries. This allows locations in areas with inaccurate GPS coverage (e.g., urban areas) to have a higher threshold than the locations having more accurate GPS coverage.

If the determination at block 818 is negative, the method 800 returns to block 816 as described above. If the determination at block 818 is affirmative, at block 820, the sealing box may determine whether a release has been requested. The determination may be based on detecting receipt of an unseal message from a delivery device. If the determination at block 820 is affirmative, at block 822, the sealing box may activate the motor to disengage the first end of the sealing shackle. The activation at block 822 may cause the sealing mechanism of the sealing box to resemble the sealing mechanism shown in FIGS. 4A and 4B. Once complete, the sealing box may transmit a release confirmation message to a delivery device connected with the sealing box.

At block 890, the method 800 ends. Returning to block 820, if the sealing box determines that release of the seal has not been requested, the method 800 may return to block 816 as described.

In some implementations, the method 700 or the method 800 or may include periodic signaling between the sealing box and the delivery device. The sealing box may log these signaling events to further enhance the auditing of the seal. For example, if the sealing box transmits a presence request to the delivery device and does not receive a response, it may indicate that the cargo carrier was left unattended. This information can be important when assessing the state of the cargo carrier or the seal.

Figure 9:
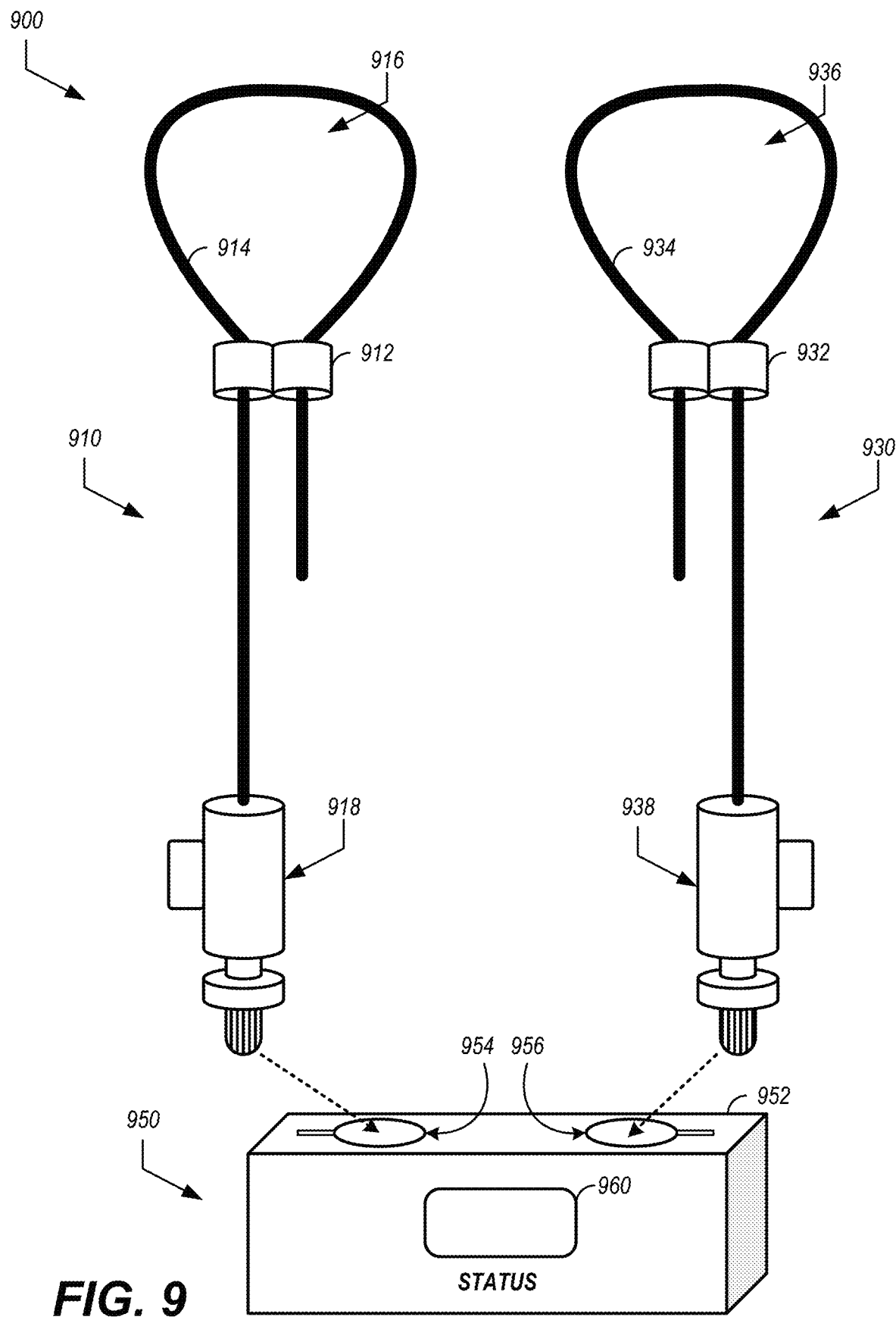
FIG. 9 illustrates an example embodiment of a seal with an affixed sealing shackle.

FIG. 9 illustrates an example embodiment of a seal with an affixed sealing shackle. The seals described in FIGS. 2 and 3 can be reused on different vehicles. In FIG. 9, the seal 900 includes a first sealing shackle 910 and a second sealing shackle 930 which can be permanently or semi-permanently affixed to a vehicle. A link line 914 of the first sealing shackle 910 may pass through a ferrule 912. One end of the link line 914 includes a first memory device 918 similar to the memory devices shown in FIGS. 2 and 3. The other end of the link line 914, is left barren. The link line 914 forms a loop 916 which can be affixed to a door or other structure of a vehicle. Similarly, a link line 934 of the second sealing shackle 930 may include a ferrule 932. One end of the link line 934 includes a second memory device 938 similar to the memory devices shown in FIGS. 2 and 3. The other end of the link line 934, is left barren.

Like the seals shown in FIG. 2 or 3, the seal 900 includes a sealing box 950. A housing 952 of the sealing box 950 includes a first receiving channel 954 and a second receiving channel 956. The receiving channels each accept a memory device. The sealing box 950 includes one status indicator 960, but may include fewer or additional as needed. The housing 952 of sealing box 950 may include elements to perform one or more of the features described such as in FIG. 6 or 8.

FIGS. 10A-10D are pictorial diagrams showing illustrative interfaces for an electronic seal system. The user interfaces may be presented on a client communication device such as the delivery device 192 shown in FIG. 1.

Figure 10D:
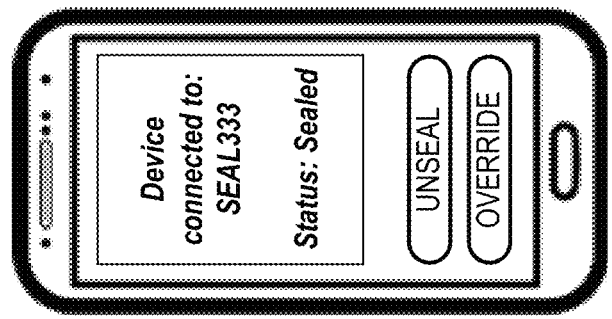
FIG. 10D illustrates an example unseal interface.
Figure 10C:
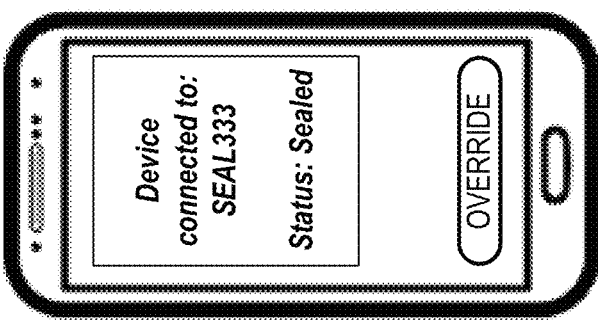
FIG. 10C illustrates an example sealed interface.
Figure 10B:
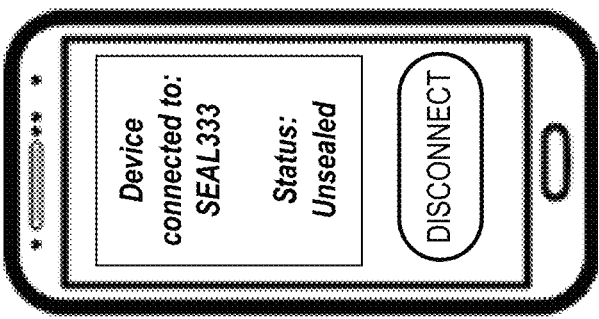
FIG. 10B illustrates an example unsealed interface.
Figure 10A:
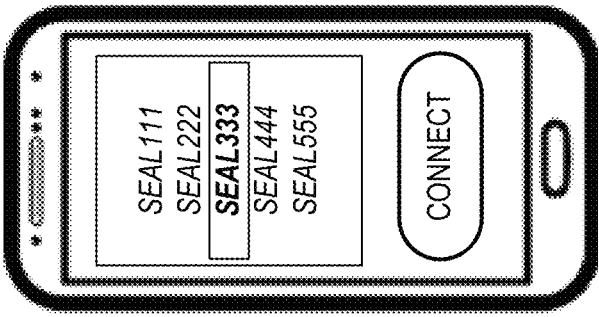
FIG. 10A illustrates an example connection interface.

FIG. 10A illustrates an example connection interface. As shown in FIG. 10A, a list view of seals detected within the range of the communication device are displayed. The list may be receive a selection of a seal to connect with. In FIG. 10A, SEAL 333 is selected. The connection interface may include a button or other control to initiate the connection process. As shown in FIG. 10A, the button labeled "CONNECT" is provided. Upon detecting activation of the connect button, the communication device may attempt to connect with the seal as described. In some implementations, it may be desirable to include a control to transmit a request for identification of a selected seal. For example, if multiple seals are present, the interface may receive a selection of a seal and, upon activation of the identification control, cause the seal to emit a perceivable identification. One example of a perceivable identification is adjustment of the status indicator(s) on the associated seal thereby signaling the seal's identity.

FIG. 10B illustrates an example unsealed interface. Once connected, the communication device may receive status information for the seal. This information may be presented via a user interface such as that shown in FIG. 10B. The unsealed interface includes information indicating which seal the user device is currently connected to. The unseal interface includes information indicating the status of the seal. In FIG. 10B, the seal status is unsealed. The interface may include a button or other control to disconnect with the seal. For example, if the communication device inadvertently connects with the wrong seal, it may be desirable to release the connection. As shown in FIG. 10B, the button labeled "DISCONNECT" is provided. In some implementations, it may be desirable to include a user interface control to transmit a request for identification of a selected seal as described above.

FIG. 10C illustrates an example sealed interface. Once the seal is sealed, the communication device may be unable to unseal the seal. For example, if the location of the communication device or the seal does not correspond to an authorized destination, the sealed interface may not include an option to request unsealing of the seal. The sealed interface includes information indicating which seal the user device is currently connected to. The sealed interface includes information indicating the status of the seal. In FIG. 10C, the seal status is sealed.

It may be necessary to unseal the seal during transit such as in the event of an emergency or unplanned detour. To account for such events, the sealed interface may include a button or other control to override the seal. The override button, when activated, may transmit a message to a support server. The support server may, in turn, collect additional information from the delivery agent via the communication device. Once the support server confirms the authenticity of the request, the support server may transmit a message to the communication device authorizing unseal. The message may include a new entry for the sealing information (e.g., as shown in Table 1) including the current location of the communication device. In some implementations, the message may activate the unseal function of the communication device.

FIG. 10D illustrates an example unseal interface. The unseal interface may be used to request transmission of a seal release message from the communication device to the seal. The unseal interface may include an "UNSEAL" button to cause transmission of the seal release message. The unseal interface may include an "OVERRIDE" button in the event the seal release message fails to release the seal similar to the override discussed with reference to FIG. 10C.

Figure 11:
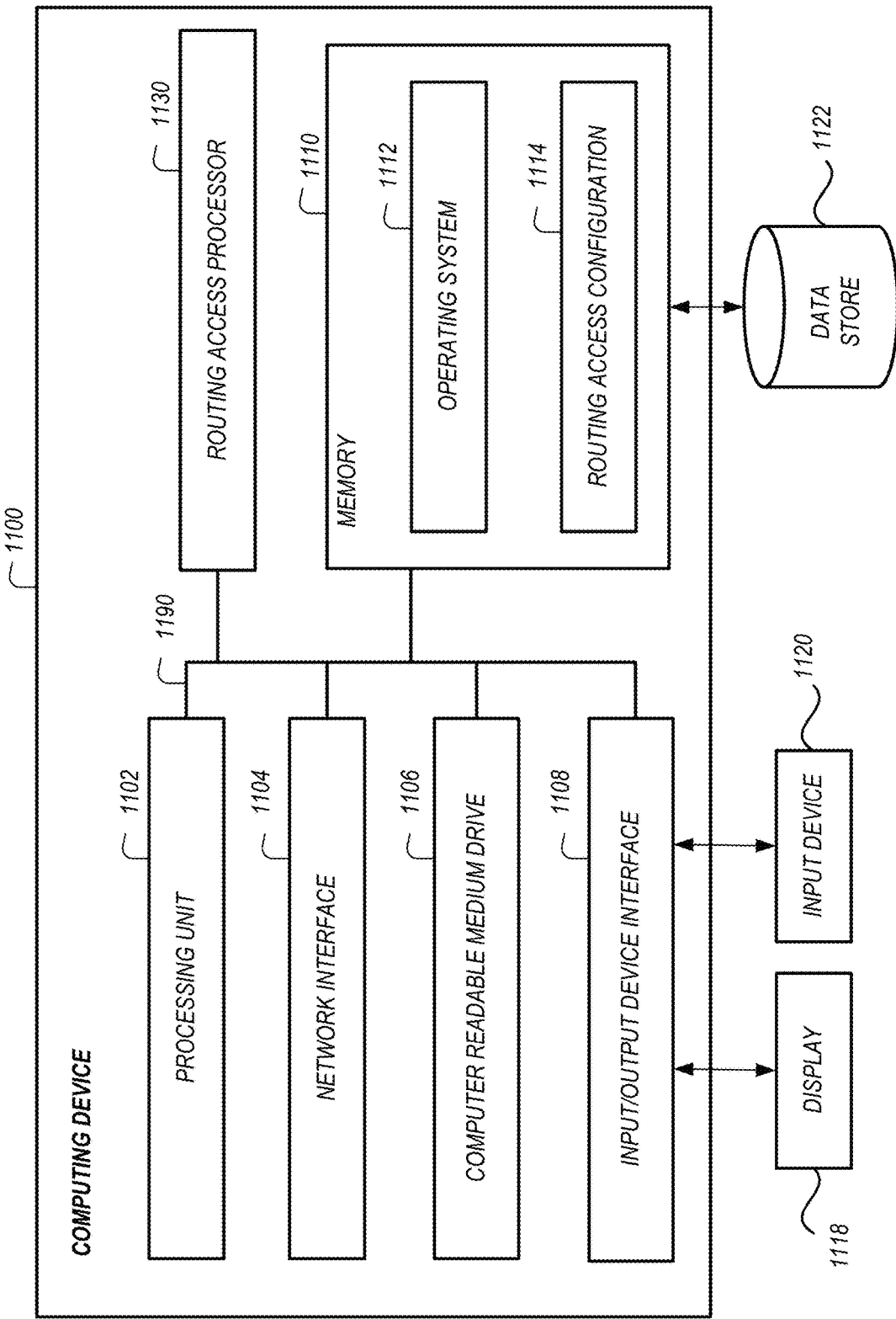
FIG. 11 is a block diagram of an illustrative computing device that may implement one or more of the electronic seal features described.

FIG. 11 is a block diagram of an illustrative computing device that may implement one or more of the electronic seal features described. The computing device 1100 may implement the methods, interfaces, or messaging shown in of FIG. 7 or 10A-10D. The computing device 1100 can be a server or other computing device, and can include a processing unit 1102, a routing access processor 1130, a network interface 1104, a computer readable medium drive 1106, an input/output device interface 1108, and a memory 1110. The network interface 1104 can provide connectivity to one or more networks or computing systems. The processing unit 1102 can receive information and instructions from other computing systems or services via the network interface 1104. The network interface 1104 can also store data directly to memory 1110. The processing unit 1102 can communicate to and from memory 1110 and output information to an optional display 1118 via the input/output device interface 1108. The input/output device interface 1108 can also accept input from the optional input device 1120, such as a keyboard, mouse, digital pen, microphone, mass storage device, etc.

The memory 1110 contains computer program instructions that the processing unit 1102 executes in order to implement one or more embodiments. The memory 1110 may include RAM, ROM, and/or other persistent, non-transitory computer readable media. The memory 1110 can store an operating system 1112 that provides computer program instructions for use by the processing unit 1102 or other elements included in the computing device in the general administration and operation of the computing device 1100. The memory 1110 can further include computer program instructions and other information for implementing aspects of the present disclosure.

For example, in one embodiment, the memory 1110 includes a routing access configuration 1114. The routing access configuration 1114 may include the thresholds, authentication information (e.g., encryption keys, tokens, device identifiers etc.), route information, or other predetermined or configurable values described above. The routing access configuration 1114 may store specific values for a given configuration. The routing access configuration 1114 may, in some implementations, store information for obtaining values for a given configuration element. For example, a routing access server may be specified as a network location (e.g., uniform resource locator (URL) for the service) in conjunction with username and password information to access the network location to obtain routing information. The routing access configuration 1114 may be used by the routing access processor 1130 to implement one or more of the aspects described herein. In some implementations, the routing access processor 1130 may include specific computer executable instructions that cause the computing device 1100 to perform one or more of the electronic seal features described.

The memory 1110 may also include or communicate with one or more auxiliary data stores, such as data store 1122. The data store 1122 may electronically store data regarding the item, the delivery agent, the delivery device, the delivery location, vehicle control servers, access control configurations for locations or devices, do not disturb rules, and the like.

The elements included in the computing device 1100 may be coupled by a bus 1190. The bus 1190 may be a data bus, communication bus, or other bus mechanism to enable the various components of the computing device 1100 to exchange information.

In some embodiments, the computing device 1100 may include additional or fewer components than are shown in FIG. 11. For example, a computing device 1100 may include more than one processing unit 1102 and computer readable medium drive 1106. In another example, the computing device 1100 may not be coupled to the display 1118 or the input device 1120. In some embodiments, two or more computing devices 1100 may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An electronic seal device (e.g. delivery device or sealing box) can be or include a microprocessor, but in the alternative, the access establishing device can be or include a controller, microcontroller, or state machine, combinations of the same, or the like configured to authenticate and authorize remote access for delivery of an item. An access establishing device can include electrical circuitry configured to process computer-executable instructions. Although described herein primarily with respect to digital technology, an access establishing device may also include primarily analog components. For example, some or all of the sealing algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by an electronic sealing device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the access establishing device such that the electronic sealing device can read information from, and write information to, the storage medium. In the alternative, the storage medium can be integral to the electronic sealing device. The electronic sealing device and the storage medium can reside in an application specific integrated circuit (ASIC). The ASIC can reside in a delivery device or other electronic sealing device. In the alternative, the electronic sealing device and the storage medium can reside as discrete components in a delivery device or electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. An apparatus for securing a cargo carrier comprising:
    a sealing shackle comprising a first cable memory attached to a first end of the cable and a second cable memory attached to a second end of the sealing shackle; and
    a sealing box comprising:
        a first coupling channel adapted to receive the first end of the sealing shackle;
        a second coupling channel adapted to receive the second end of the sealing shackle;
        a sealing box data store;
        a processor;
        a location transceiver coupled with the processor; and
        a motor coupled with the processor, and
    wherein the processor is configured by specific instructions stored in the sealing box data store to at least:
        receive an authentication value from the first cable memory passive received by the first coupling channel;
        receive the authentication value from the second cable memory received by the second coupling channel;
        determine that the authentication value corresponds to a shackle verification value stored in the sealing box data store;
        store destination location information in the sealing box data store;
        activate the motor to engage the first end of the sealing shackle and the second end of the sealing shackle with the sealing box;
        receive location information from the location transceiver;
        determine that the location information corresponds to the destination location information; and
        activate the motor to disengage the first end of the sealing shackle and the second end of the sealing shackle from the sealing box.

2. The apparatus of claim 1, wherein the processor is further configured by specific instructions to at least:
    detect engagement of the first end of the sealing shackle and the second end of the sealing shackle with the sealing box based at least in part on a state of the motor;
    store, in the sealing box data store, first temporal information indicating a time at which the engagement occurred;
    detect disengagement of at least one of: (a) the first end of the sealing shackle, or (b) the second end of the sealing shackle from the sealing box based at least in part on the state of the motor; and
    store, in the sealing box data store, second temporal information indicating at time at which the disengagement occurred.

3. The apparatus of claim 1, further comprising:
    an optical indicator coupled with the processor,
    wherein the processor is further configured by specific instructions to at least:
        detect engagement of the first end of the sealing shackle and the second end of the sealing shackle with the sealing box based at least in part on a state of the motor;
        activate the optical indicator upon detecting the engagement;
        detect disengagement of at least one of: (a) the first end of the sealing shackle, or (b) the second end of the sealing shackle from the sealing box based at least in part on the state of the motor; and
        deactivate the optical indicator in response to detecting the disengagement.

4. The apparatus of claim 1, further comprising a personal area network transceiver coupled with the processor, the personal area network transceiver configured to communicate with a mobile device via a personal area network,
    wherein the processor is further configured by specific instructions to at least:
        receive, from the mobile device via the personal area network, a seal control message, wherein the seal control message causes the motor to activate.

5. An apparatus comprising:
    a first coupling channel adapted to receive a first end of a shackle;
    a sealing box data store;
    a processor;
    a location detector coupled with the processor;
    a first seal shaft; and
    a motor coupled with the processor, wherein the motor adjusts a position of the first seal shaft,
    wherein the processor is configured by specific instructions stored in the sealing box data store to at least:
        receive an authentication value from a first memory device received by the first coupling channel, wherein the first memory device is attached to the first end of the shackle;
        determine that the authentication value corresponds to a verification value stored in the sealing box data store;
        store destination location information in the sealing box data store;
        activate the motor to engage the first end of the shackle with the first seal shaft;
        receive location information from the location detector;
        determine that the location information corresponds to the destination location information; and
        activate the motor to disengage the first end of the shackle from the first seal shaft.

6. The apparatus of claim 5, wherein the shackle includes a second end, and wherein the second end is integrally coupled to the sealing box.

7. The apparatus of claim 5, further comprising:
    a second coupling channel adapted to receive a second end of the shackle; and
    a second seal shaft, wherein the motor adjusts a position of the second seal shaft,
    wherein the shackle includes a second memory device attached to a second end of the shackle,
    wherein the processor is in communication with the second coupling channel, and
    wherein the processor is further configured by specific instructions to at least:

receive the authentication value from the second memory device received by the second coupling channel;

determine that the authentication value corresponds to the verification value stored in the sealing box data store; and activate the motor to engage the second end of the shackle from the second seal shaft.

8. The apparatus of claim 5,
wherein the apparatus comprises the shackle, and
wherein the shackle further comprises a ferrule binding a second end of the shackle to a portion of the shackle between the second end and the first end.

9. The apparatus of claim 5, wherein the processor is further configured by specific instructions to at least:

detect engagement of the first end of the shackle with the first seal shaft based at least in part on a state of the motor;

store, in the sealing box data store, first temporal information indicating a first time at which the engagement occurred;

detect disengagement of the first end of the shackle from the first seal shaft based at least in part on the state of the motor; and store, in the sealing box data store, second temporal information indicating a second time at which the disengagement occurred.

10. The apparatus of claim 5, further comprising:
an optical indicator coupled with the processor,
wherein the processor is further configured by specific instructions to at least:

detect engagement of the first end of the shackle with the seal shaft based at least in part on a state of the motor;

activate the optical indicator in response to detecting the engagement;

detect disengagement of the first end of the shackle from the seal shaft based at least in part on the state of the motor; and deactivate the optical indicator in response to detecting the disengagement.

11. The apparatus of claim 5, further comprising a wireless transceiver coupled with the processor, the wireless transceiver configured to communicate with a mobile device, wherein the processor is further configured by specific instructions to at least:

receive, from the mobile device, a seal control message, wherein the seal control message causes the motor to activate.

12. The apparatus of claim 11, wherein the seal control message causes the motor to activate to engage the first end of the shackle with the first seal shaft, wherein processor is further configured by specific instructions to at least:

store, in the sealing box data store, an identifier for the mobile device;

receive, from the mobile device, a second seal control message, wherein the second seal control message requests disengagement of the first end of the shackle from the first seal shaft, and wherein the second seal control message includes a requesting device identifier, wherein the processor activates the motor in response to determining that the requesting device identifier corresponds to the identifier for the mobile device.

13. The apparatus of claim 5, further comprising a rechargeable battery, and wherein the rechargeable battery provides power to at least the processor, the location detector, and the motor.

14. The apparatus of claim 5, further comprising the shackle, wherein the shackle includes a link line connected to the first memory device, wherein the link line is at least two feet long, and wherein the shackle is formed at least in part of steel coated with a water resistant sheath.

15. A computer implemented method comprising:
under control of one or more processing devices:

receiving an authentication value from a first memory device affixed to a first end of a shackle received by a first coupling channel of a sealing device;

determining that the authentication value corresponds to a verification value stored in a data store;

storing destination location information in the data store;

activating a motor of the sealing device to engage the first end of the shackle with the sealing device;

receiving, from a location detector, location information of the sealing device;

determining that the location information corresponds to the destination location information; and activating the motor to disengage the first end of the shackle from the sealing device.

16. The computer-implemented method of claim 15, further comprising:

receiving the authentication value from a second memory device attached to a second end of the shackle received by a second coupling channel of the sealing device;

determining that the authentication value corresponds to the verification value stored in the data store; and activating the motor to engage the second end of the shackle with the sealing device.

17. The computer-implemented method of claim 15, further comprising:

detecting engagement of the first end of the shackle with the sealing device based at least in part on a state of the motor;

storing, in the data store, first temporal information indicating a first time at which the engagement occurred;

detecting disengagement of the first end of the shackle with the sealing device based at least in part on the state of the motor; and storing, in the data store, second temporal information indicating a second time at which the disengagement occurred.

18. The computer-implemented method of claim 15, further comprising:

detecting engagement of the first end of the shackle with the sealing device based at least in part on a state of the motor;

activating an optical indicator in response to detecting the engagement;

detecting disengagement of the first end of the shackle with the sealing device based at least in part on the state of the motor; and deactivating the optical indicator in response to detecting the disengagement.

19. The computer-implemented method of claim 15, further comprising:

wirelessly receiving, from a mobile device, a seal control message, wherein the seal control message causes the motor to activate.

20. The computer-implemented method of claim 19, wherein the seal control message causes the motor to activate to engage the first end of the shackle with the sealing device, wherein computer-implemented method further comprises:

storing, in the data store, an identifier for the mobile device;

wirelessly receiving, from the mobile device, a second seal control message, wherein the second seal control message requests disengagement of the first end of the shackle from the sealing device, and wherein the second seal control message includes a requesting device identifier; and wherein the motor is activated to disengage the first end of the shackle from the sealing device in response to determining that the requesting device identifier corresponds to the identifier for the mobile device.

\* \* \* \* \*